United States Patent [19]

Ionna

[11] 4,418,943
[45] Dec. 6, 1983

[54] DUCT FITTING

[75] Inventor: Samuel A. Ionna, Cincinnati, Ohio

[73] Assignee: The Williamson Company, Cincinnati, Ohio

[21] Appl. No.: 295,788

[22] Filed: Aug. 24, 1981

[51] Int. Cl.³ .......................................... F16L 25/00
[52] U.S. Cl. ................................... 285/12; 285/177; 285/424
[58] Field of Search .................... 285/12, 424, 177

[56] References Cited

U.S. PATENT DOCUMENTS

| | | |
|---|---|---|
| 73,887 | 1/1868 | Green . |
| 216,991 | 7/1879 | Abbott . |
| 369,211 | 8/1887 | Smith . |
| 414,200 | 11/1889 | Elliott . |
| 514,857 | 2/1894 | Laube . |
| 672,548 | 4/1901 | Durall . |
| 687,556 | 11/1901 | Carter . |
| 864,034 | 8/1907 | Rudderow ......................... 285/177 |
| 1,108,259 | 8/1914 | Sixma ............................. 285/424 X |
| 1,818,858 | 8/1931 | McAlees ............................. 285/177 |
| 2,431,172 | 11/1947 | Hurrison ............................. 285/177 |
| 2,880,017 | 3/1959 | Anderson et al. ............. 285/424 X |
| 3,543,670 | 12/1970 | Stone . |

Primary Examiner—Dave W. Arola
Attorney, Agent, or Firm—Wood, Herron & Evans

[57] ABSTRACT

A duct fitting in which at least one end of the fitting is provided with an attachment structured to cooperate with either the male end or the female end of a duct to be connected therewith. The fitting's attachment includes a ring immobily fixed to the fitting, and an expandable/collapsible collar adjustably connected to the ring. A bead on the ring bead and a flange on the collar cooperate to retain the collar in connected relation with the fitting so that the collar may be expanded or collapsed throughout its length as desired depending on whether the fitting is to be connected with a duct's male end or female end. The collar also incorporates rivet and slot structure that defines the inner and outer circumference limits of the collar.

14 Claims, 6 Drawing Figures

U.S. Patent    Dec. 6, 1983    4,418,943
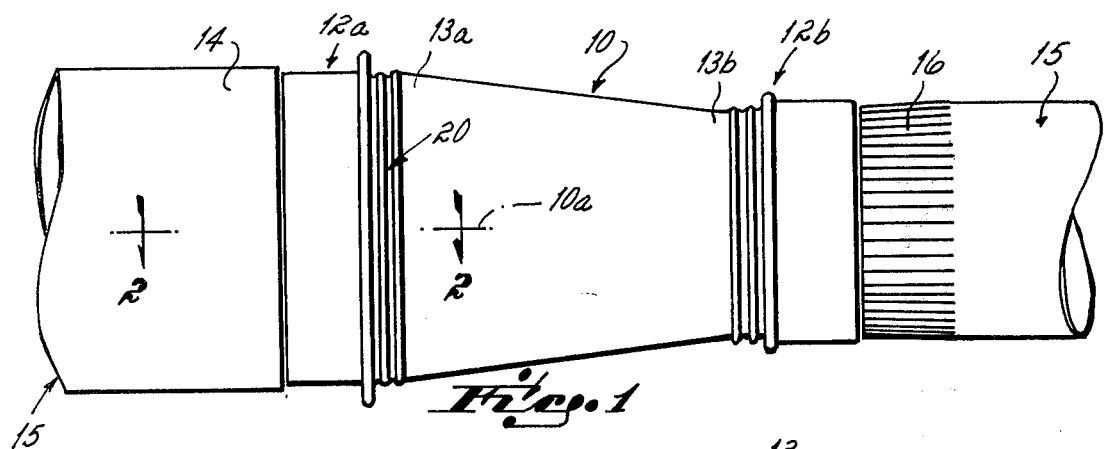
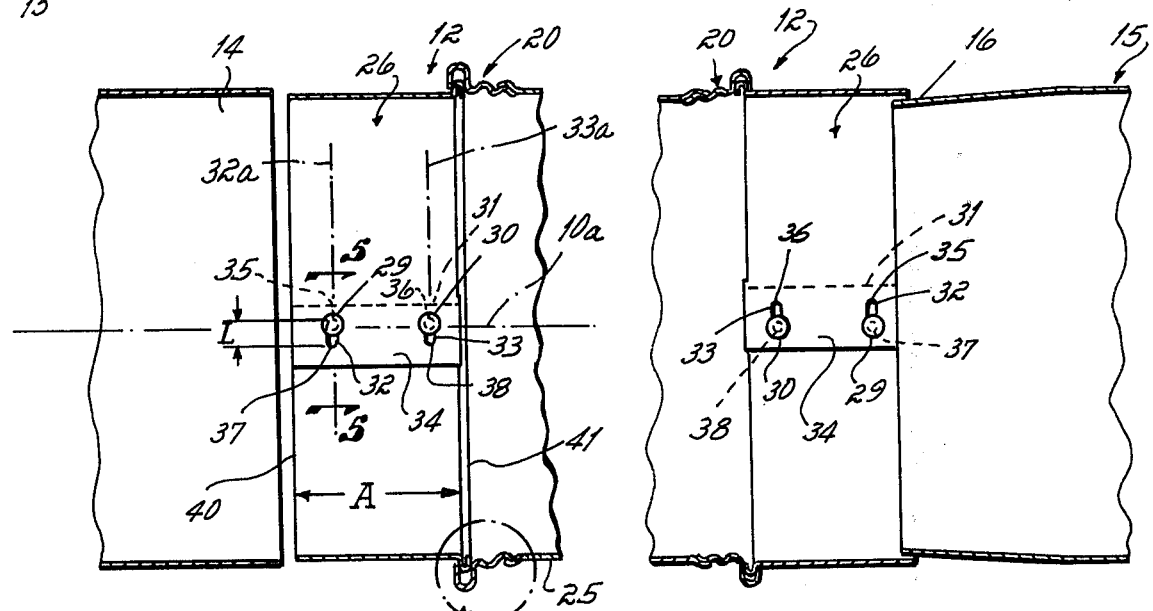
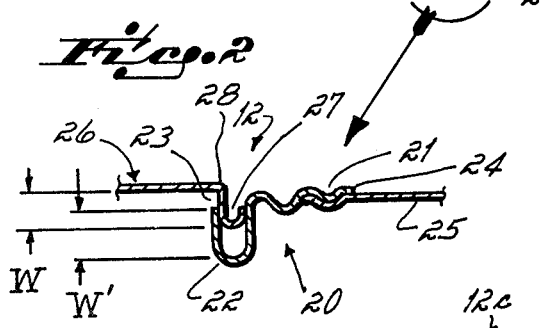
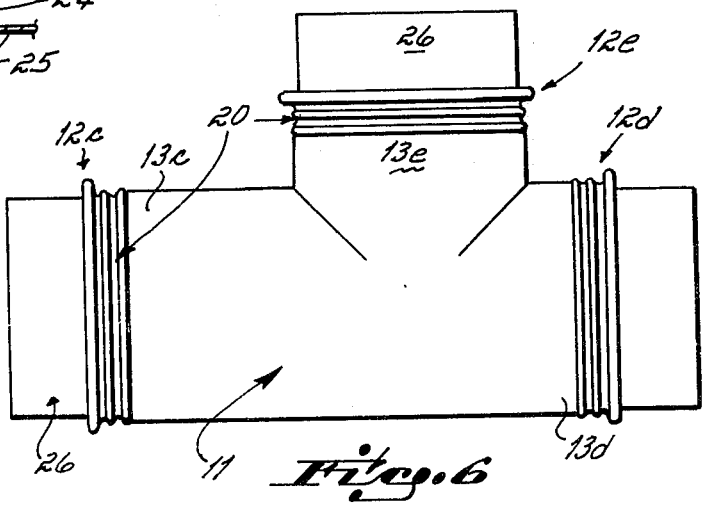
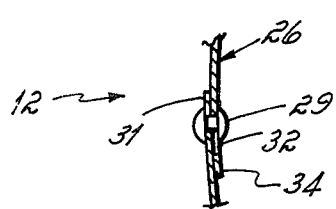

DUCT FITTING

This invention relates to duct work. More particularly, this invention relates to a duct fitting for use in a duct run.

Duct work, in the form of extended length duct runs, is commonly used in heat and air conditioning systems for buildings. The duct work defines the warm air and/or cool air distribution system to the various areas of the building from the furnace and/or air conditioning equipment. In connection with such duct work, a duct run commonly may be comprised of larger cross-section pipe sections or ducts close to the warm or cool air source equipment, and smaller cross-section pipe sections or ducts that feed the discharge outlets in the building's rooms. The smaller cross-section ducts are connected with the layer cross-section ducts, and the larger ducts are connected with the furnace and/or air conditioning equipment.

A number of duct fittings are normally required throughout an air distribution system, i.e., throughout the system's duct runs, in oder to efficiently size the duct work relative to the heating and/or cooling capacity of the heating and/or air conditioning equipment for the building. A reducer fitting, for example, functions to interconnect two in-line pipe sections or ducts, the upstream section being of a larger cross-section and the downstream section being of a smaller cross-section. Another type duct fitting is a take-off fitting which is in the nature of a tee fitting. The tee fitting interconnects two duct pipe sections of a master duct run where both ducts are of the same cross-sectional area and configuration, and allows a take-off duct run to be connected with the master duct run.

In round pipe or cylindrical duct work as used in the heating and air conditioning industry, it is generally the case that each duct or pipe section is crimped at one end, i.e., the male end, and is not crimped at the other end, i.e., the female end. On light sheet metal cylindrical duct of the type commonly used in the residential heating and air conditioning business, it is commonly the case that the female end of each duct section is significantly larger in circumference than the male end circumference of that duct section. For example, in a six inch diameter duct, the difference in circumference between male and female ends may be on the order of 3/16 inch or so. This male/female end relationship of cylindrical ducts allows the ducts work installer to easily connect adjacent pipe sections together when installing round pipe duct work throughout the building within which it is used. But the male/female end relationship of round pipe sections used in this type duct work also causes problems to the installer, as well as to the material supplier for the installer, of the round pipe duct work system.

A first problem with prior art duct fittings arises because a plural number of each type and size duct fitting must be stocked by the supplier to make same available for use by the installer of the round pipe duct work. For example, and in the case of reducer fittings, reducer fittings of th same size and configuration must be provided in three different styles, one with the large diameter end crimped and the small diameter end not crimped, one with the large diameter end not crimped and the small diameter end crimped, and one with both ends not crimped. A similar problem in the case in connection with tee fittings. For each tee fitting of the same size and configuration, the tee fitting also must be provided in three different styles, one with a crimp on the branch and no crimp on the run, one with no crimp on the branch and with no crimp on the run, and one with a crimp on the branch and with a crimp on the run. All these plural models or styles of each duct fitting causes an inventory problem to the installer's supplier. This inventory problem requires, in the case of the reducer duct fitting or the tee fitting, for example, that the supplier carry three models or styles for each size fitting. And this approach, of course, results in an economic disadvantage to the supplier and, therefore, a higher cost to the owner of the building within which the round pipe duct work is to be installed.

A second problem with prior art fittings of the type above described is encountered by the field installer of the round pipe duct work system. Normally a field installer of duct work will select the reducer fittings and/or tee fittings required at an installation site prior to commencing erection of the duct work system at that site. But if the installer's supplier provides by mistake the wrong style of a selected duct fitting, i.e., a fitting with a crimped end when the job requires a fitting with no crimped end, or if the installer himself selects by mistake the wrong style of a duct fitting required for the job, and if the installer does not realize the mistake until he is on the job site ready to make the installation, the installer is faced with a time and labor problem in that he must return to the supplier for the correct duct fitting. This, of course, results in an economic disadvantage to the installer in that is increases the installer's cost of completing installation of the duct work system.

It is the primary objective of this invention, therefore, to provide an improved duct fitting for use in a duct run, that fitting having at least on end which is adjustable as desired by the fitting's installer to allow that fitting to be connected with a duct's male end or female end.

In accord with this objective, the improved duct fitting of this invention includes an attachment at one end of the fitting which is structured to cooperate with either the male end or the female end of a duct to be connected therewith. The fitting's attachment includes a ring immobility fixed to the fitting and an expandable/collapsible collar adjustably connected to the ring. A bead on the ring and a flange on the collar cooperate to retain the collar in connected relation with the fitting so that the collar may be expanded or collapsed throughout its length as desired depending on whether the fitting is to be connected with a duct's male end or female end. The collar also incorporates rivet and slot structure that defines the inner and outer circumference limits of the collar.

Other objectives and advantages will be more apparent from the following detailed description taken in conjunction with the drawings in which:

FIG. 1 is a side view of a reducer duct fitting incorporating the principles of this invention;

FIG. 2 is a cross-sectional view taken along lines 2—2 of FIG. 1;

FIG. 3 is a cross-sectional view similar to FIG. 2 but with the duct partially inserted within the fitting;

FIG. 4 is a enlarged view of the encircled portion of FIG. 2;

FIG. 5 is a cross-sectional view taken along line 5—5 of FIG. 2; and

FIG. 6 is a side view of a tee duct fitting in accord with the principles of this invention.

This invention is directed to a duct fitting of any configuration, a reducer type duct fitting 10 being shown in FIGS. 1-5 and a tee type duct fitting 11 being shown in FIG. 6. A novel attachment 12 is connected to at least one of each fitting's ends 13a, 13b, respectively, the attachment being expandable or retractable so that any end of the fitting can interconnect with either the female end 14 of a duct 15 or the male end 16 of a similar duct. When the fitting's attachment 12 is collapsed, it is insertable in the female end 14 of the round pipe duct 15, and when it is expanded it is insertable over the crimped male end 16 of the round pipe duct 15. In this regard, and in round pipe duct 15 work of the kind commonly used in residential heating and air conditioning systems, the circumference of the duct's crimped male end 16 is somewhat smaller than the circimference of the duct's non-crimped female end 14, e.g., 3/16" or so smaller in a 6" diameter round pipe duct 15. The fitting's attachment 12, therefore, is structured to accommodate this difference as it expands/collapses as required. In the reducer fitting 10 embodiment shown in FIGS. 1-5, and in the tee fitting 11 embodiment shown in FIG. 6, a novel attachment 12 in accord with the principles of this invention is shown connected with each end of each fittings.

The attachment 12 for reducer fitting 10 of circular cross section is shown in detail in FIGS. 1-5. The attachment 12a at one end 13a of the reducer fitting 10 is identical from a structural concept standpoint to the attachment 12 at the other end 13b of the fitting, the only difference being that attachment 12b is smaller from a dimensional standpoint than is attachment 12a since the ends 13a, 13b themselves are of different sizes. Further, the attachment 12a, 12b used at the two ends 13a, 13b of the reducer fitting is identical from a structural standpoint to the attachments 12c-12e used at the three ends 13c-13e of the tee fitting 11 of circular cross section as shown in FIG. 6. The attachments 12c-12e on the run ends 13c, 13d and on the branch end 13e of the tee fitting 11 are all sized identical one to the other since those ends are all of identical size. In other words, the duct fittings attachments 12a-12e illustrated in FIGS. 1-6, from structural and operational or use standpoints, are all identical one to the other, in the FIGS. 1-5 embodiment the attachment 12 being shown on a reducer duct fitting 10 and in the FIG. 6 embodiment the attachment 12 being shown on a tee duct fitting 11.

Each attachment 12 of reducer fitting 10 is mounted on an end 13 of that fitting. The attachment 12 includes a ring 20 permanently fixed to the fitting's end 13 by an annular bead joint 21, the ring defining an inwardly turned annular bead 22 at its outer or mouth end 23. The inner end 24 of the ring is crimped to the duct fitting's end 13a around the circumference thereof to provide the crimped bead joint 21. Note particularly that the inwardly turned annular bead 22 of the fixed ring 20 is located exteriorly or outside of the duct fitting's cylindrical wall 25.

The attachment 12 also includes a collapsible collar 26 that has an outwardly turned annular flange 27 at its inner end 28, the flange being received in slip fit relation within the ring's inwardly turned annular bead 22. The collar's outwardly turned flange 27 and the ring's inwardly turned bead 22 are sized and configured, i.e., are each of sufficient width W, W', to permit sufficient play or slippage therebetween for allowing adjustment to a maximum circumference collar 26 (see FIGS. 3 and 5) or a minimum circumference collar (see FIGS. 2 and 4), i.e., expanded and retracted collar positions, without the collar being disconnected from the ring 20. The collar 26 is expandable/collapsible because rivets 29, 30 attached to one end 31 of the collar are received in and cooperate with slots 32, 33 formed in the other end 34 of the collar. Note the slots 32, 33 are each located in a plane 32a, 33a that is generally normal or perpendicular relative to the fitting's axis 10a. The rivet 29, 30 and slot 32, 33 relationship permits the outer circumference of the collar 26 to be varied a distance equal to the length L of the slots. In other words, it is the length L of the slots 32, 33 which sets the minimum circumference limit and the maximum circumference limit for the collar 26. In this regard, the minimum circumference collar position is shown in FIGS. 2 and 4 in which each slot's minimum end 35, 26 is abutted against the rivets 29, 30 fixed to the collar. In this use attitude, therefore, the duct fitting's collar 26 is receivable within the female end 14 of a duct 15 as shown in FIG. 2. Alternatively, and with the collar 26 expanded so that the rivets 29, 30 are abutted against each slot's maximum end 37, 38, a duct's male end 16 is receivable within the collar as shown in FIG. 3.

The length L of each of the slots 32, 33 is equal one to the other. And the length L of each of the slots 32, 33 must be at least equal to , but preferably is slightly greater than, the difference in circumference length between the male end 16 of a duct 15 and the female end 14 of the duct with which the fitting 10 is to be used. In other words, and in the case of a 6" diameter duct 15 where the section's male end 16 is about 3/16" in circumferential length less than the circumferential length of the section's female end 14, the slots must be at least about 3/16" in length.

Note particularly that the rivet 29, 30 and slot 32, 33 relationship of the collar 26 is such that the collar is expandable or retractable throughout its length A in equal fashion, i.e., the maximum one end 40 diameter of the collar 26 is equivalent to the maximum other end 41 diameter of the collar when the collar is fully expanded, and the minimum one end 40 diameter of the collar is equal to the minimum other end 41 diameter of the collar when the collar is fully collapsed. This interfit relationship of the collar 26 with the ring 20 is accommodated because of the slip fit relation between the collar's outwardly turned flange 27 and the ring's inwardly turned bead 22. In this regard, therefore, the collar 26 is not only expandable and retractable diametrically relative to the duct fitting's cylindrical wall 25, but is also rotatable relative to that fitting 10, because of the slip fit relation between the collar's outwardly turned flange 27 and the ring's inwardly turned bead 22. This flange 27/bead 22 connection, therefore, allows an installer to more easily manipulate or rotate the duct fitting 10 relative to duct 15 as may be required to facilitate installation of a duct work system.

In manufacture of the attachment 12 for the duct fitting 10 or 11 of this invention, the ring 20 is first connected to the fitting by crimped bead joint 21. Thereafter the collar 26, without rivets 29, 30 connected thereto, is initially circularly collapsed until the collar's outwardly turned flange 27 is of an outer circumference less than the inner circumference of the ring's inwardly turned bead 22. The roller's flange 27 is then aligned with the ring's bead 22, and the collar 26 is expanded until the collar's flange is received in the ring's bead. Thereafter the rivets 29, 30 are installed with end 31 of the collar 26 through slots 32, 33. This, therefore, interconnects the collar 26 with the ring 20 so that the collar can no longer escape the ring and, therefore, so that the collar is permanently attached to the duct fitting.

Therefore, the attachment 12 of this invention, when installed on each end 13 of a duct fitting 10 or 11, allows only a single style of each fitting to be made by the fitting manufacturer, and therefore allows only a single style of each fitting to be carried in inventory by a fitting supplier. This, of course, eliminates the supplier's inventory problem referred to above. Also, the attachment 12 allows the fitting installer to expand or retract the collar 26 at each end of the fitting 10 or 11 as needed to fit into the female end 14 or over the male end 16 of the cylindrical duct 15 to which the fitting is to be connected during installation of cylindrical duct work. In other words, the novelty of this invention lies in the attachment 12 that allows connection of the fitting 10 or 11 to either the female end or male end of a cylindrical duct as used in heating or air conditioning duct work. This, of course, eliminates possible fitting mis-selection which might otherwise create time and labor problems for the installer as referred to above.

Having described in detail the preferred embodiment of my invention, what I desire to claim and protect by Letters Patent is:

1. A duct fitting that allows connection of said fitting to either the female or the male end of a duct, said fitting comprising
    a ring and a collar assembled one with another, said collar being expandable relative to said ring between a maximum circumference position position defining means on said collar defining said minimum and maximum position, and a minimum circumference position, said collar being receivable over the male end of a duct in said maximum position and being receivable within the female end of a duct in said minimum position, and
    connector means by which said collar is connected with said ring, said connector means being structured to permit expansion and contraction of said collar rotative to said ring as desired by said fitting's user, said connector means comprising
        an inwardly turned bead fixed on one of said ring and said collar, and
        a flange connected to the other of said ring and said collar, said bead and said flange cooperating to permit said collar to be expanded or retracted as desired by said fitting's user without substantial relative axial movement therebetween.

2. A duct fitting as set forth in claim 1, said connector means also being structured to permit rotation of said collar relative to said fitting.

3. A duct fitting as set forth in claim 1, that one of said bead and said flange fixed to said ring being annular in configuration and extending outwardly beyond the periphery of said ring.

4. A duct fitting as set forth in claim 1, said position defining means comprising
    rivet and slot means connected to said collar, said rivet and slot means defining the minimum and maximum limits by which said collar can be expanded and contracted.

5. A duct fitting as set forth in claim 4, said slot structure being established in a plane generally perpendicular to the longitudinal axis of said ring.

6. A duct fitting as set forth in claim 4, said rivet and slot means and said connector means being structured so that said collar is expandable and retractable substantially equally at both ends thereof if desired by said fitting's user.

7. A duct fitting as set forth in claim 1, said fitting comprising, on each end of said fitting, said ring, said collar and said connector means.

8. A duct fitting as set forth in claim 7, said fitting being a reducer fitting.

9. A duct fitting as set forth in claim 7, said fitting being a tee fitting.

10. An attachment for a duct fitting that allows connection of said fitting to either the female or the male end of a duct, said attachment comprising
    a ring and a collar assembled one with another, said collar being expandable relative to said ring between a maximum circumference position position defining means on said collar defining said minimum and maximum position, and a minimum circumference position, said collar being receivable over the male end of a duct in said maximum position and being receivable within the female end of a duct in said minimum position, and
    connector means by which said collar is connected with said ring, said connector means being structured to permit expansion and contraction of said collar relative to said ring as desired by said fitting's user, said connector means comprising
        an inwardly turned bead fixed on one of said ring and said collar, and
        a flange connected to the other of said ring and said collar, said bead and said flange cooperating to permit said collar to be expanded or retracted as desired by said fitting's user without substantial relative axial movement therebetween.

11. An attachment as set forth in claim 10, said connector means also being structured to permit rotation of said collar relative to said fitting.

12. An attachment as set forth in claim 10, said position defining means comprising
    rivet and slot means connected with said collar, said rivet and slot means defining the minimum and maximum limits by which said collar can be expanded and contracted.

13. An attachment as set forth in claim 12, said rivet and slot means and said connector means being structured so that said collar is expandable and retractable substantially equally at both ends thereof if desired by said fitting's user.

14. An attachment as set forth in claim 13, that one of said bead and said flange fixed to said ring being annular in configuration and extending outwardly beyond the periphery of said ring.

* * * * *